(12) United States Patent
Sackheim et al.

(10) Patent No.: US 9,598,323 B2
(45) Date of Patent: Mar. 21, 2017

(54) OXIDIZER COMPOUND FOR ROCKET PROPULSION

(71) Applicant: CFD Research Corporation, Huntsville, AL (US)

(72) Inventors: Robert L. Sackheim, Madison, AL (US); Joseph R. Herdy, Owens Cross Roads, AL (US)

(73) Assignee: CFD Research Corporation, Huntsville, AL (US)

( * ) Notice: Subject to any disclaimer, the term of this patent is extended or adjusted under 35 U.S.C. 154(b) by 0 days.

(21) Appl. No.: 15/006,652

(22) Filed: Jan. 26, 2016

(65) Prior Publication Data

US 2016/0176771 A1 Jun. 23, 2016

Related U.S. Application Data

(60) Division of application No. 13/715,647, filed on Dec. 14, 2012, now abandoned, which is a continuation-in-part of application No. 11/619,674, filed on Jan. 4, 2007, now abandoned.

(51) Int. Cl.
| | | |
|---|---|---|
| *C06B 47/00* | (2006.01) | |
| *C06B 47/04* | (2006.01) | |
| *D03D 23/00* | (2006.01) | |
| *D03D 43/00* | (2006.01) | |
| *C06B 43/00* | (2006.01) | |
| *F02K 9/42* | (2006.01) | |
| *C06B 33/08* | (2006.01) | |
| *F02C 7/22* | (2006.01) | |

(52) U.S. Cl.
CPC .............. *C06B 43/00* (2013.01); *C06B 33/08* (2013.01); *C06B 47/04* (2013.01); *F02C 7/22* (2013.01); *F02K 9/425* (2013.01)

(58) Field of Classification Search
USPC ............... 149/46, 1, 74, 108.2, 109.2, 109.4
See application file for complete search history.

(56) References Cited

U.S. PATENT DOCUMENTS

| | | | |
|---|---|---|---|
| 2,403,932 A * | 7/1946 | Lawson | ................. C01B 21/36 149/74 |
| 6,652,682 B1 * | 11/2003 | Fawls | .................... B82Y 30/00 149/22 |
| 6,779,335 B2 | 8/2004 | Herdy, Jr. | |
| 2002/0092290 A1 * | 7/2002 | Herdy, Jr. | ............... C06B 47/04 60/218 |

(Continued)

*Primary Examiner* — James McDonough
(74) *Attorney, Agent, or Firm* — Maschoff Brennan

(57) ABSTRACT

The present disclosure generally pertains to a rocket propulsion oxidizer compound that is a solution, is a homogenous and stable liquid at room temperature and includes nitrous oxide and nitrogen tetroxide. In addition, an apparatus is provided for burning a fuel and nitrous oxide/nitrogen tetroxide. The apparatus has a combustor, a catalyst, a nitrous oxide/nitrogen tetroxide supply passage for directing the nitrous oxide/nitrogen tetroxide to a contact position with the catalyst, and a fuel supply passage for supplying the fuel to the combustor. The catalyst acts to facilitate decomposition of the nitrous oxide/nitrogen tetroxide, while the combustor burns the fuel, the decomposed nitrous oxide/nitrogen tetroxide and/or nitrous oxide/nitrogen tetroxide decomposed in the reaction.

20 Claims, 9 Drawing Sheets

(56) References Cited

U.S. PATENT DOCUMENTS

2003/0192633 A1* 10/2003 Diede ............... C06D 5/04
                                                149/109.4
2004/0221933 A1* 11/2004 Hallit ............... C06D 5/08
                                                149/1
2005/0241294 A1   11/2005 Cesaroni

* cited by examiner

INJECTOR DESIGN FOR $N_2O$ AND $C_3H_8$ USED IN NOP ROCKET 2

OXIDIZER COMPOUND FOR ROCKET PROPULSION

CROSS REFERENCE TO RELATED APPLICATION

This application is a divisional of U.S. patent application Ser. No. 13/715,647 filed on Dec. 14, 2012, which is a continuation-in-part of U.S. patent application Ser. No. 11/619,574 filed on Jan. 4, 2007, each of these applications being herein incorporated by specific reference in their entirety for all purposes.

This application is related to U.S. Pat. No. 6,779,335 filed on Dec. 7, 2001, which is incorporated herein by references.

GOVERNMENT INTEREST

The invention described herein was made in part by an employee of the United States Government and may be manufactured and used by or for the Government of the United States of America for governmental purposes without the payment of any royalties thereon or therefore.

FIELD OF THE INVENTION

This invention relates to rocket propellants. More specifically, the invention is an approach to catalyze an oxidizer solution to combust with a fuel, catalyze a fuel to combust with an oxidizer solution, or combine catalyzed oxidizer and fuel solutions producing combustion for use in a rocket propulsion system.

RELATED ART

The need for high performance propulsion systems for space access and satellites has existed for decades. Small and large propulsion systems are needed for a variety of tasks or systems including rocket boost, orbit insertion and maintenance, attitude control systems (ACS), reaction control systems (RCS), station keeping, orbital maneuvering systems (OMS), and auxiliary power units (APU). The drawbacks and consequences associated with systems utilizing current propellants are daunting, while research and development efforts over the years have not greatly improved the technology during this period. Present systems are either liquid propellants that use hypergolic or cryogenic oxidizers, or solid propellants that are single use only, cannot be throttled, and can be highly toxic and/or can detonate.

The current challenge is to attain the high energy and density goals for these propulsion systems while maintaining acceptable physical properties for the propellants. In general, the research goal is to identify propellants for a chemical propulsion system that are readily available, have known handling characteristics, low or minimized-toxicity, produce high performance, and provide significant reductions in the cost of operations. While the problem is well understood, practical solutions which meet the objectives have been elusive and research has not been very fruitful to date.

In terms of liquid and hybrid propulsion systems that use oxidizers and fuels, the problems and tradeoffs associated with current oxidizers and fuels are varied and well known. For example, high operating costs result from occupational safety requirements associated with the handling of toxic, hypergolic propellants using inherently dangerous oxidizing materials such as fluorine, pure nitrogen tetroxide ($N_2O_4$), inhibited red fuming nitric acid, etc.; fuels hydrazine, monomethylhydrazine, etc. If the oxidizer or fuel propellant requires cryogenic storage (e.g., propellants using liquid oxygen, nitrogen fluoride, liquid hydrogen, liquid methane, etc.), other or additional operating complications include the storage of the materials in a way that prevents "boil off" prior to usage. Cryogenic storage systems also require the use of insulation which adds dry weight to both launch and space vehicles thereby reducing the vehicle's payload weight fraction. While less toxic and easily stored propellant oxidizers are known (e.g., nitrous oxide ($N_2O$)), their energy (i.e., heat of formation or $\Delta H_f$) is generally too low to provide the required performance. While less toxic and easily stored propellant fuels are known (e.g. RP-1, a derivative of kerosene, or propane ($C_3H_8$)), they lack the capability to be hypergolic when combined with the oxidizer, thus requiring a more complex system and requiring an external ignition source.

Other drawbacks and limitations of current technologies include the added weight and complexity of pressurants and feed systems for the propellants, state change of the propellants during prolonged storage, and the general problems of hot gas impingement and contamination to cold receiving surfaces from undesirable exhaust gas constituents. Unfortunately, current solutions available to address the storage and handling issues severely impact performance. Research to identify new liquid propellants (i.e., both fuels and oxidizers) is needed to enhance performance and minimize or eliminate the above-described undesirable properties without added complexity and cost. Finally, one of the most significant future needs is operational responsiveness enabled by on-demand propulsion systems for manned and unmanned missions that can be operational with short notice. This requirement places a premium on development of storable, non-cryogenic and non-toxic or lower toxicity propellants that also meet reasonably high performance requirements.

SUMMARY OF THE INVENTION

Accordingly, it is an object of the present invention to provide an oxidizer for use in a rocket propulsion system, and a fuel, with either or both being decomposed by a catalyst to promote ignition and thus rocket propulsion.

Another object of the present invention is to provide a catalyst, including but not limited to iridium, platinum, rhodium, tungsten, copper, cobalt (etc.) metals supported by high-surface-area substrate such as alumina or mullite.

Another object of the present invention is to provide a rocket propulsion approach that mixes the catalyst into the fuel such that it creates a hypergolic reaction when mixed with the oxidizer.

Still another object of the present invention is to provide the use of a catalyst bed to heat the fuel to temperatures such that it promotes spontaneous ignition with the oxidizer.

Yet another object of the present invention is to provide the use of a catalyst bed to decompose the oxidizer heated to a temperature such that ignition occurs when mixed with a fuel.

Other objects and advantages of the present invention will become more obvious hereinafter in the specification and drawings.

In accordance with the present invention, a fuel solution for use in a rocket propulsion system is provided. The solution is a mixture that is a homogenous and stable liquid at room temperature that includes derivatives of kerosene (e.g. RP-1) or propane mixed with 4% propylene. A catalyst such as but not limited to iridium, platinum, rhodium, tungsten, copper, cobalt (etc.) are mixed in all or a portion of the fuel to provide for a hypergolic reaction when mixed with an oxidizer.

Also in accordance with the present invention, a fuel solution for use in a rocket propulsion system is provided, which is passed over a catalyst bed consisting of metals such as but not limited to iridium, platinum, rhodium, tungsten, copper, cobalt (etc., creating sufficient heat to provide ignition when combined with an oxidizer.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
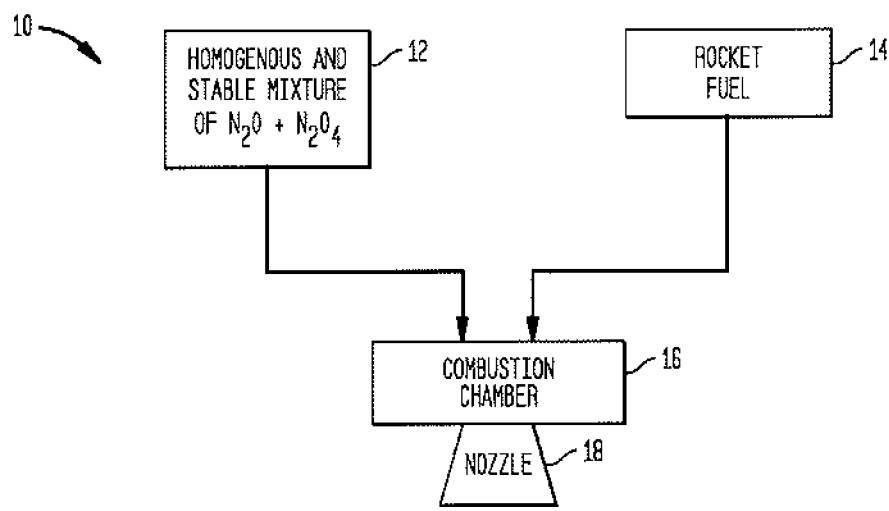
FIG. 1 is a schematic view of a rocket propulsion system using a fuel and an oxidizer solution in accordance with the present invention.

The novel oxidizer solution of the present invention can be used in a variety of rocket propulsion systems to include, for example, those used in launch vehicle propulsion systems, multi-mode spacecraft propulsion systems, upper stage spacecraft propulsion systems, and missile propulsion systems. Furthermore, the oxidizer solution of the present invention can be matched with a variety of propellant fuels in these propulsion systems. Accordingly, it is to be understood that the type of propulsion system and/or propellant fuel used therein are not limitations of the present invention.

In general, the oxidizer solution of the present invention is a solution of nitrous oxide dissolved into nitrogen tetroxide that is homogenous and a stable liquid (i.e., will not boil off as long as it is contained in a pressure vessel) at room temperature. As used herein, the term "room temperature" is defined as temperatures that are generally close to approximately 20° C. or 72° F. as would be well understood in the art.

The new oxidizer solution of the present invention strikes a balance over a variety of oxidizer attributes that have traditionally been at odds with one another. More specifically, critical attributes balanced by the oxidizer solution of the present invention can be described as follows:
minimizes storage problems by providing for room temperature storage thereof;
reduces propulsion system weight since room temperature storage reduces need for storage tank insulation;
provides for long-term storage since cryogenic boil-off is not a problem;
has a relatively high specific impulse when compared to traditional energetic but inherently problematic oxidizers;
has a relatively high energy density when compared to traditional energetic but inherently problematic oxidizers;
is a lower toxicity in its stored state versus pure nitrogen tetroxide;
reduces the dangerous tendency for spontaneous decomposition of pure nitrous oxide due to inadvertent heating as has been seen in some instances;
produces environmentally benign exhaust products when burned in a propulsion system;
lowers the freezing point versus that of pure nitrogen tetroxide, and
creates a oxidizer that is partially self-pressurized due to the higher vapor pressure of nitrous oxide, as the gas over the solution would be primarily nitrous oxide.

As mentioned above, the oxidizer solution is a homogenous, stable-liquid room temperature solution that includes nitrous oxide and nitrogen tetroxide. While the particular solution should strike an attribute balance for the particular propulsion system, it has been found that this balance is generally achieved for many of today's propulsion systems when the solution includes at least approximately 35% (molar ratio) nitrogen tetroxide in the solution and can range up to approximately 65% (molar ratio) nitrogen tetroxide. In terms of weight percent, this translates to a solution having at least approximately 28 weight percent nitrogen tetroxide ranging up to approximately 52 weight percent nitrogen tetroxide. However, it is to be understood that other applications and propulsion systems may be able to create and utilize oxidizer solutions having as little as 5 weight percent nitrogen tetroxide (i.e., 95 weight percent nitrous oxide) or as much as 95 weight percent nitrogen tetroxide (i.e., 5 weight percent nitrous oxide), without departing from the scope of the present invention. These percentages were arrived at using the Trans 72 Chemical Equilibrium Combination (CEC) Prediction Code disclosed by S. Gordon et al. in "Computer Program for Calculation of Complex Chemical Equilibrium Compositions, Rocket Performance, Incident and Reflected Strikes, and Chapman-Jouquet Denotations," NASA Report No. NASA-SP-273, 1971.

The oxidizer solution of the present invention could also include small or trace amounts of one or more additives that enhance performance, improve chemical stability, adjust exhaust by-products, etc., without departing from the scope of the present invention. For example, the oxidizer solution might have its performance enhanced by including a trace amount of an earth-storable oxidizer that has a "theoretical" specific energy (i.e., BTU's/lb) greater than that of nitrous oxide, but that would be too dangerous/toxic to use in any appreciable quantity. "Earth-storable" oxidizers are those that are liquids at room temperature such as "inhibited red fuming nitric acid" (IRFNA), nitrogen tetroxide or hydrogen peroxide. The term "theoretical" is used because the oxidizer's elements do not attain specific energy until mixed with a fuel that can be oxidized thereby. It is necessary to add propylene to a fuel catalyst because it contains a double bond, which will absorb and react on the catalyst. In addition, adding molecules like anhydrous ammonia will offer the $N_2O_4$ a polar-polar interaction, which then can be catalyzed.

The presently disclosed oxidizer may be used with a variety of hydrocarbon fuels in which an "imbedded trigger" may be introduced. As used herein, an "imbedded trigger" is a substance that when introduced in small amounts (ranging from a trace to several or more percentages of the solution) adds catalytic ability to a fuel that normally has no catalytic properties. The catalytic reaction then heats or moves the remainder of the fuel to a chemical state produces a spontaneous reaction when introduced to an oxidizer. This reaction may or not be a hypergolic reaction. The trace amounts of propylene present in the propane acts as an embedded trigger. Likewise, the ammonia present in the nitrous oxide/nitrogen tetroxide mix is an imbedded trigger. Other imbedded triggers may be identified for most hydrocarbon fuels and/or oxidizers.

Referring now to FIG. 1, a top level schematic of a rocket propulsion system using the oxidizer solution of the present invention is shown and is referenced generally by numeral 10. One storage container 12 stores (at room temperature) the homogenous and stable-liquid, nitrous oxide/nitrogen tetroxide solution of the present invention. A second storage container 14 stores a rocket fuel such as propane (with perhaps a bit of propylene), methane or RP-1. A combustion chamber 16 coupled to containers 12 and 14 through control valves (not shown) that control the mixing/burning of the oxidizer solution/rocket fuel with the combustion by-products being exhausted via a nozzle 18 to generate thrust. A variety of well-known mixing and exhausting systems can be used. Accordingly, combustion chamber 16 and nozzle 18 are not limitations of the present invention.

The form of the homogenous solution of nitrous oxide and nitrogen tetroxide can be a non-viscous liquid or a viscous liquid (i.e., a gel) without departing from the scope of the present invention. Non-viscous liquid forms of the present invention would typically be used in launch vehicle propulsion systems and multi-mode propulsion systems. The gel form of the present invention might be used in some missile applications.

Applying a predictive testing routine using the above-referenced Trans 72 CEC Prediction Code, the oxidizer solution of the present invention was compared to liquid oxygen (LOX) and nitrogen tetroxide ($N_2O_4$) oxidizers in a propulsion system using methane ($CH_4$) as the rocket fuel. Comparisons of specific impulse (ISP) at a particular oxidizer-to-fuel (O/F) ratio and typical exhaust products are presented in Table 1 below. Also shown in Table 1, this is a predictive test of the present invention's oxidizer solution (i.e., $N_2O$—$N_2O_4$ solution) used in a propulsion system operating using two examples of well-known RP-1 rocket fuels, methane and RP-1.

TABLE 1

| | Rocket Fuel: | | | | |
| --- | --- | --- | --- | --- | --- |
| | $CH_4$ | $CH_4$ | $CH_4$ | RP-1 | RP-1 |
| Oxidizer: | LOX | $N_2O_4$ | 65% $N_2O$, 35% $N_2O_4$ | LOX | 65% $N_2O$, 35% $N_2O_4$ |
| ISP: | 407.4 | 382.5 | 351.9 | 405.8 | 333.6 |
| O/F: | 4.0 | 5.8 | 7.4 | 3.3 | 6.4 |
| CO: | 0.00005 | 0.0000 | 0.000000 | 0.03405 | 0.00000 |
| $CO_2$: | 0.33265 | 0.2479 | 0.20189 | 0.47224 | 0.28881 |
| H: | 0.00000 | 0.0000 | 0.00000 | 0.00005 | 0.00000 |

TABLE 1-continued

| | Rocket Fuel: | | | | |
| --- | --- | --- | --- | --- | --- |
| | $CH_4$ | $CH_4$ | $CH_4$ | RP-1 | RP-1 |
| HCO: | 0.00000 | 0.0000 | 0.00000 | 0.00000 | 0.00000 |
| HNO: | 0.00000 | 0.0000 | 0.00000 | 0.00000 | 0.00000 |
| $HO_2$: | 0.00000 | 0.0000 | 0.00000 | 0.00000 | 0.00000 |
| $H_2$: | 0.00006 | 0.0000 | 0.00006 | 0.0127 | 0.00000 |
| $H_2O$: | 0.66532 | 0.4958 | 0.40378 | 0.48088 | 0.28044 |
| $H_2O_2$: | 0.00000 | 0.0000 | 0.00000 | 0.00000 | 0.00000 |
| N: | 0.00000 | 0.0000 | 0.00000 | 0.00000 | 0.00000 |
| $N_2$: | 0.00000 | 0.2507 | 0.39413 | 0.00000 | 0.42458 |
| O: | 0.00000 | 0.0000 | 0.00000 | 0.00000 | 0.00000 |
| OH: | 0.00006 | 0.0000 | 0.00000 | 0.00007 | 0.00000 |
| $O_2$: | 0.00185 | 0.0056 | 0.00021 | 0.00000 | 0.00616 |

As is readily apparent from the data in Table 1, the oxidizer solution of the present invention provides comparable specific impulse performance at statistically greater oxidizer-to-fuel ratios. That is, the high-density oxidizer solution of the present invention means that less storage tank volume is required as compared to liquid oxygen. Also, the dissolving of the nitrous oxide into the nitrogen tetroxide results in an oxidizer solution where the combined volume is not the sum of the two separate oxidizer volumes, which results in an even denser oxidizer solution. Accordingly, vehicle performance will be improved owing to smaller storage tank requirements. Further, since the present invention oxidizer can be stored at room temperature, the problems associated with the cryogenic storage of liquid oxygen are eliminated. The nitrous oxide-nitrogen tetroxide solution of the present invention is safe to handle (using the traditional methods or combinations of methods for nitrous oxide or nitrogen tertoxide alone), has self-pressurizing attributes, and produces benign exhaust products as is evidenced by the data in Table 1.

Figure 2:
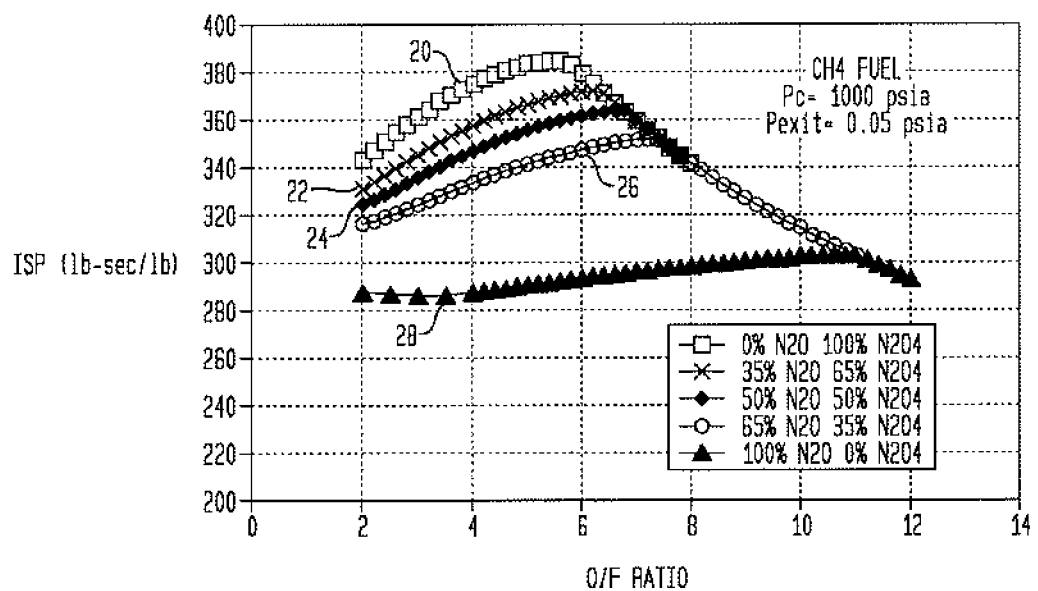
FIG. 2 illustrates graphs of oxidizer-to-fuel ratio versus specific impulse for a variety of fuel-oxidizer combinations to include several examples of oxidizer compounds in accordance with the present invention.

To further illustrate the advantages of the present invention, FIG. 2 shows graphs of oxidizer-to-fuel ratio versus specific impulse for methane fuel and the oxidizers listed in Table 2.

TABLE 2

| Oxidizers (in weight percent) | Curve No. |
| --- | --- |
| 100% $N_2O_4$ | 20 |
| 48% $N_2O$, 52% $N_2O_4$ | 22 |
| 68% $N_2O$, 32% $N_2O_4$ | 24 |
| 72% $N_2O$, 28% $N_2O_4$ | 26 |
| 100% $N_2O$ | 28 |

As is clearly evident from these curves, having at least approximately 28 weight percent nitrogen tetroxide in the nitrous oxide-nitrogen tetroxide oxidizer solution, with the resulting benign exhaust products, yields comparable specific impulse performance to the highly dangerous nitrogen tetroxide oxidizer used alone while yielding greatly superior specific impulse performance when compared to an oxidizer that is 100 weight percent nitrous oxide. Thus, the new oxidizer solution of the present invention solves the problems associated with the use of cryogenic liquid oxygen and provides better performance than liquid oxygen, while simultaneously providing performance comparable to the more highly energetic oxidizers without any of the handling/storage problems associated therewith.

The advantages of the present invention are further evidenced by the data in Table 3 below. In particular, it is evident that the addition of nitrous oxide ($N_2O$) to nitrogen tetroxide ($N_2O_4$), even in modest amounts, results in a significant percentage of payload to orbit capability versus liquid oxygen (LOX) when a first order analysis of only Total Impulse for a given Gross Lift Off Weight (GLOW) is compared for two heritage launch systems (i.e., "Delta II" and "Atlas V"). When nitrous oxide is added in increasingly larger amounts (i.e., moving from right to left on Table 3), the "penalty" in terms of payload percentage is small while the decrease in toxicity of the exhaust products increases substantially.

TABLE 3

Total Impulse (propellant mass × Isp = lbm · sec) vs $N_2O/N_2O_4$ Oxidizer (Numbers are $N_2O/N_2O_4$ molar ratio)
(quantities in parentheses denote ratio referenced to LOX-based value)

|  | LOX-based | 65/35 | 50/50 | 40/60 |
|---|---|---|---|---|
| Atlas V |  |  |  |  |
| $1^{st}$ Stage: RP-1 | 211692442 | 192749659 | 193895227 | 194495850 |
|  | (1.000) | (0.911) | (0.916) | (0.919) |
| $2^{nd}$ Stage: $LH_2$ | 20709920 | 17314374 | 17605499 | 17762898 |
|  | (1.000) | (0.836) | (0.850) | (0.858) |
| Total (Payload to Orbit Ratio) | 232402362 | 210064033 | 211500727 | 212258748 |
|  | (1.000) | (0.904) | (0.910) | (0.913) |
| Delta II |  |  |  |  |
| GEMs (strap-on) | 63937554 | 63937554 | 63937554 | 63937554 |
|  | (1.000) | (1.000) | (1.000) | (1.000) |
| $1^{st}$ Stage: RP-1 | 63943535 | 58964553 | 59317742 | 59477505 |
|  | (1.000) | (0.922) | (0.928) | (0.930) |
| $2^{nd}$ Stage: $N_2O_4$/Aerozine 50 | 4244070 | 4244070 | 4244070 | 4244070 |
|  | (1.000) | (1.000) | (1.000) | (1.000) |
| Total (Payload to Orbit Ratio) | 132125159 | 127146177 | 127499366 | 127659129 |
|  | (1.000) | (0.962) | (0.965) | (0.966) |

Figure 3:
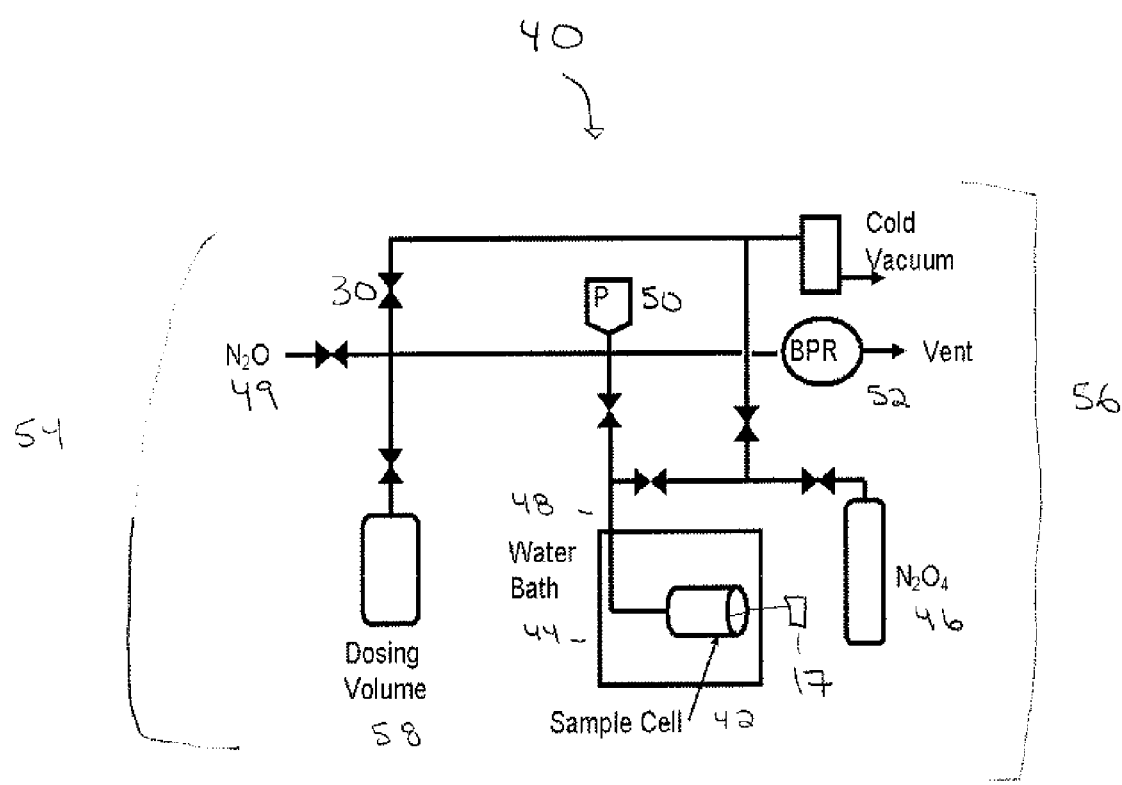
FIG. 3 illustrates an experimental apparatus that is used to dissolve the nitrous oxide into nitrogen tetroxide.

FIG. 3 is an exemplary embodiment of a system 40 to produce the presently described oxidizer and measure $N_2O$ absorption into $N_2O_4$. The system 40 is composed of several separate components all designed to handle high pressures and retain $N_2O_4$ liquid and $N_2O$ gas. For this system 40, welded fittings and stainless steel tubing made of 316L are used. Other wetted components include Teflon and special diaphragm materials to prevent corrosion by $N_2O_4$. Medical grade or research grade $N_2O$ are required to minimize any reactivity from contaminates.

A sample cell 42 composed of a high pressure sight gauge (not shown) is contained in a temperature controlled water bath 44. Here a measured sample volume of liquid $N_2O_4$ 46 is be added to the sight gauge 17. Since the total volume, pressure and temperature of the sample cell 42 are known, the volume of liquid $N_2O_4$ 16 and its vapors ($N_2O$ and $NO_2$) can be determined from the equilibrium constant. The liquid level is photographed and the liquid level recorded between each successive adsorption as outlined below.

The left side of this system contains a dosing volume 18 that is filled with gaseous $N_2O$ 49. Between these two systems is a transfer volume 48 that contains a pressure transducer 50 and back pressure regulator 52 to measure the pressure and control possible over-pressurization that might occur in the system should the equilibrium constant for this now ternary system be upset and go single phase. The effluent from the bath pressure regulator 52 is vented into a water bath (not shown), as $NO_2$ will react with water forming $HNO_3$ (nitric acid).

In operation, the dosing side 54 of this system is charged with $N_2O$ 49 at pressures much higher than the equilibrium $NO_2$ pressure in the sample cell 42. Each experiment begins when the isolation valve (not shown) to the sample side 56 is opened. The $N_2O$ will expand and as adsorption occurs via the dissolving of the $N_2O$ into the $N_2O_4$ liquid. The difference between the expected non-reactive expanded volume and the actual gas volume after equilibrium occurs as measured by the transducer 50 within the known volumes is be used to determine solubility. A data acquisition system (not shown) will monitor the pressure. As a result, the moles of gas absorbed into the $N_2O_4$ liquid can be calculated because all of the volumes are known. Once equilibrium is known, the isolation valve is closed and the pressure in the dosing volume 58 increased. The process then continues. Using this process, the phase diagram for this system at a given temperature may be determined.

Figure 4:
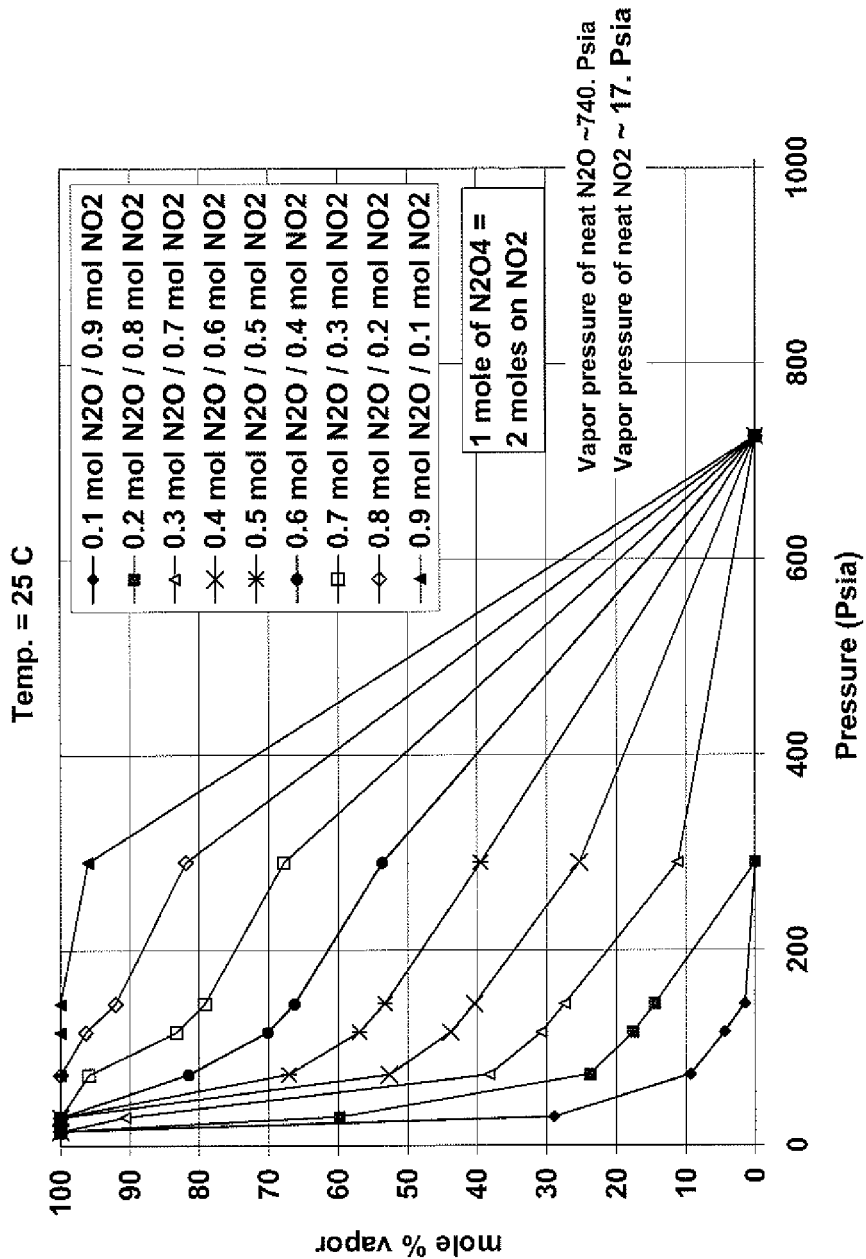
FIG. 4 is a graph illustrating the vapor pressure attributes of the oxidizer of the present invention.
Figure 5:
FIG. 5 is a graph illustrating the pressure, critical temperature and freezing point conditions of the oxidizer of the present invention.

The process is repeated at several temperatures to determine additional parameters important to extending the system 40 to higher temperature operations. Depending on the character of the phase diagram, various thermodynamic equations of state may apply. FIG. 4 illustrates vapor pressure attributes for the $N_2O/N_2O_4$ oxidizer at several molar fractions. FIG. 5 illustrates pressure, critical temperature and freezing point conditions for the $N_2O/N_2O_4$ oxidizer.

In an additional embodiment, the invention provides a nitrous oxide ($N_2O$)-nitrogen tetroxide ($N_2O_4$)/propane ($C_3H_8$) rocket engine (NOP), or any other hydrocarbon fuel, which utilizes catalytic decomposition of $N_2O/N_2O_4$ as an igniter system. This propellant combination is an alternative to the present system. In this embodiment, a heterogeneous catalyst is utilized. Here, "heterogeneous catalysis" is a form of catalysis where the phase of the catalyst differs from that of the reactants. The term "phase" here refers not only to solid, liquid, and gas, but also includes immiscible liquids, for instance oil and water. The great majority of practical heterogeneous catalysts are solids while the great majority of reactants are gases or liquids. Reactants diffuse to the heterogeneous catalyst surface where they absorb, via the formation of chemical bonds. After reaction, the products desorb from the surface and diffuse away. The transport phenomena and surface chemistry involved with heterogeneous catalysts, such as dispersion, are important when determining reaction conditions. If diffusion rates are not taken into account, the reaction rates for various reactions on surfaces depend solely on the rate constants and reactant concentrations. For solid heterogeneous catalysts, the surface area of the catalyst as critical as it determines the availability of catalytic sites.

The catalytic reaction often produces heat, and in the case of the use of a catalyst on nitrous oxide/nitrogen tetroxide, this heat can cause spontaneous decomposition, producing even more heat. If a catalyst bed is used to decompose a component in the fuel, the hot fuel can also spontaneously decompose either the nitrous oxide in the oxidizer or initiate combustion of the nitrogen tetroxide with the fuel. This in turn causes the nitrous oxide to decompose, thus producing even more heat and energy. This type of reaction is often referred to as "mutual triggers".

A feature of the nitrous oxide/nitrogen tetroxide oxidizer is that it facilitates autoignition of propane and acts as a hypergolic reaction. The oxidizer can be catalytically decomposed using a wide variety of catalysts, including, for example, platinum, iridium, rhodium, tungsten carbide, copper, cobalt, and gold. This catalytic decomposition is discussed herein using a number of catalysts including, but not limited to, the iridium based Shell 405, which has a space flight heritage as a hydrazine catalyst. The decomposition process is exothermic resulting in nitrogen and oxygen at 2988° F. for complete decomposition. This hot oxidizer will autoignite propane (and most hydrocarbon fuels) on contact and will facilitate sustained combustion in a rocket combustion chamber. Using this technique, autoignition and rigorous and complete combustion can be accomplished using stable, non-toxic, storable propellants. Along the same lines, the nitrous oxide/nitrogen tetroxide oxidizer could be decomposed and used as a monopropellant in a similar fashion as hydrazine and hydrogen peroxide rocket systems. The NOP rocket concept deals specifically with nitrous oxide/nitrogen tetroxide and propane as propellants. The present invention also contemplates the use of nitrous oxide/ nitrogen tetroxide as an oxidizer and ignition source for use alone as a monopropellant or with a fuel as a bipropellant.

Figure 6:
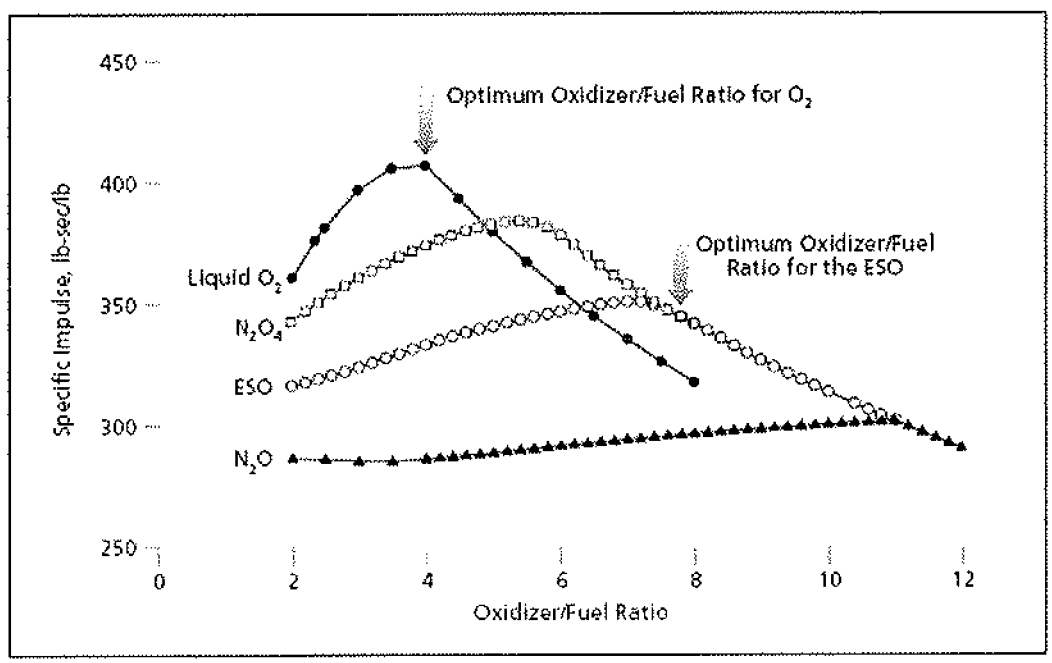
FIG. 6 is a graph comparing other oxidizers to the oxidizer solution of the present invention.

The nitrous oxide/nitrogen tetroxide oxidizer has added benefit as a space propellant in that it stores as a liquid and injected via an injector. FIG. 6, discussed in detail below, illustrates one type of injector. This creates an atomized spray comprising a mixture of liquid droplets and gas. This injection scheme is important for attitude control (AC), since liquid injection rockets cannot provide the shorter pulse times required for an ACS mission. Liquid storage gives tremendous weight benefit since a liquid tank can hold many times its own weight in propellant, whereas the same is not true for gas storage systems.

Due to the versatility of the oxidizer as both a monopropellant and oxidizer for a bipropellant system, the potential exists to set up a multi-mode propulsion system, which will improve space mission capability by reducing the dry weight overhead. A single propellant system serving all space propulsion missions from attitude control to orbital maneuvering would reduce the component count, system weight, and cost. Lower dry weight can be converted into higher payload weight fraction or $\Delta V$.

Most propellants commonly used today have relatively low vapor pressure (lower than the rocket chamber pressure) and consequently require a separate expulsion system. In contrast to these systems, the NOP propellants are self-pressurizing due to their relatively high vapor pressures (higher than the rocket chamber pressure). Consequently, they do not require separate expulsion systems and the entire tank volume can be used to store propellant. The vapor pressure of nitrous oxide/nitrogen tetroxide is approximately 750 psia and that of propane is 110 psia at ambient temperature.

The vapor pressure of propane is slightly low for it to be used as a true self-pressurizing propellant. For a NOP rocket system, high-pressure nitrous oxide/nitrogen tetroxide oxide vapor could be used as a pressurant gas for the propane by, for example, means of a bladder or diaphragm. Ethylene may also be appropriate as a propane replacement due to its higher vapor pressure.

The NOP rocket offers a non-toxic, environmentally benign propellant combination that is storable in space over long periods of time and offers comparable specific impulse to current systems. The non-toxic nature of the NOP propellants will serve to reduce operating costs due to the handling issues associated with the hypergolic propellants currently in use for space applications. The NOP propellants are benign and not highly reactive. They remain so until the nitrous oxide/nitrogen tetroxide is catalytically decomposed and combined with the fuel. Exhaust products are mainly nitrogen, water, and carbon dioxide. Another beneficial feature of the NOP rocket propellants is that the components are storable over long periods of time without degradation. For example, inadvertent decomposition is one of the main technical obstacles for hydrogen peroxide use in space propulsion systems.

The NOP rocket offers a non-toxic, environmentally benign propellant combination that is storable in space over long periods of time and offers comparable specific impulse to current systems. The non-toxic nature of the NOP propellants will serve to reduce operating costs due to the handling issues associated with the hypergolic propellants currently in use for space applications.

Calculations have shown that a NOP rocket utilizing $N_2O/N_2O_4$ as the oxidizer and methane ($CH_4$) as the fuel would be productive. These simulations indicate that the catalyst would be a hypergolic or nearly hypergolic fuel. FIG. 6 illustrates the results of a computational simulation, which predicted that only benign exhaust products would result from burning methane with a mixture of 35 mole percent of $N_2O_4$ and 65 mole percent of $N_2O$. These exhaust products primarily comprise $CO_2$, $H_2O$, and $N_2$, plus very small amounts of $O_2$. The chamber pressure was 150 psia for a 50 lbf rocket, and a fuel-rich propellant combination was used to minimize combustion instabilities. According to common practice for space-based thrusters, a pressure drop between 20-30% of chamber pressure is taken across the injectors, requiring an injection pressure of approximately 180 psia in this example. The Specific Impulse Versus Oxidizer/Fuel Ratio was calculated for methane burned with either (1) $N_2O/N_2O_4$, (2) an oxidizer comprising a solution of 65 mole percent of $N_2O$ with 35 mole percent of $N_2O/N_2O_4$, (3) $N_2O$, or (4) liquid $O_2$. The combustion-chamber and exit pressures used in the calculations were 1,000 psia ($\approx$6.89 MPa) and 0.05 psia ($\approx$345 Pa), respectively. Stoichiometry favors higher oxidizer/fuel ratios for the oxidizer than for liquid $O_2$; this is fortuitous because, as the corresponding plots shows, the higher mixture ratio yields higher specific impulse.

Figure 7:
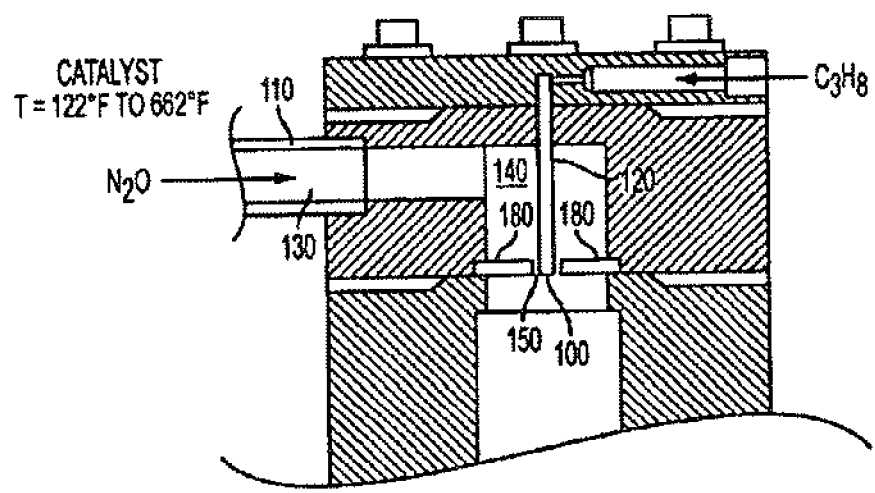
FIG. 7 is a section view of an injector in accordance with an embodiment of the invention.

The injector design for a NOP rocket engine prototype, shown in FIG. 7, is a single element, coaxial (single) swirl injector, with liquid injection of propane and two-phase phase injection of nitrous oxide/nitrogen tetroxide. Swirl tends to increase mixing and decrease the required characteristic combustor length L* and is generated by tangentially injecting the propellant off-center, with respect to the orifice through-hole. In general, swirl is better for mixing two flows and is simpler than a showerhead injector design. In addition, swirl injectors operate over a wider range of conditions and are more forgiving than other types of injectors.

As shown in FIG. 7, the liquid $C_3H_8$ fuel is injected into an inside orifice 100 and the oxidizer is injected into an outside annulus 150, between a $C_3H_8$ injector tube 120 and a sintered mesh disc 180. Initial consideration was given to a design with the fuel on the outside, coating the hot combustor walls (made of Glid-Cu, a Cu-0.15% alumina alloy) thus protecting the inner walls from oxidation. However, injection of liquid propane in a narrow annulus is not preferred, since the liquid propane surface tension may lead to asymmetric injection. Although copper is not prone to oxidation, refractory metals such as columbium (commonly used for space applications) and tungsten are indeed vulnerable to oxidation.

In this example, the liquid propane injector is sized for an injector pressure drop of 30% Pc, and the gaseous nitrous-oxide injector is sized for a pressure drop of 20% Pc. The liquid propane injector is designed for a nominal pressure drop of 45 psia at the orifice. For a nominal flow rate of 0.0149 $lb_m$/sec, at injection conditions of 70° F. and 195 psia, an orifice diameter of 0.032" is used. A ¼" S.S. tube (0.194" I.D.) feeds into the 0.032" propane injector, which is offset 0.043" from the center of a 0.118" I.D. tube, generating a swirl component. The liquid propane is then injected into the combustor from the 0.118" I.D. tube at about 6 ft/sec.

The $N_2O/N_2O_2$ is fed through a ⅜" tube (0.305" I.D.) 130, and into a stagnation chamber 140, where the $N_2O/N_2O_2$ flow turns into the sintered mesh disc 180. The sintered mesh in this example is stainless steel and has a one micron porosity, sized to pass the required flow rate with the required pressure drop. The 0.118" I.D. propane tube is preferably at the center of the sintered mesh disc. Approximately 75% of the $N_2O/N_2O_2$ flows through the annulus (with an area of ~0.039 in$^2$) between the mesh center hole and the liquid propane injector tube. Approximately 25% of the $N_2O/N_2O_2$ will flow through the porous sintered mesh, providing for transpiration cooling. The $N_2O/N_2O_2$ injector is designed for a nominal pressure drop of 30 psia across the stainless steel sintered mesh material. The nominal $N_2O/N_2O_2$ flow rate through the annulus is 0.149 $lb_m$/sec, at −25° F. and 175 psia. In this example, the $N_2O/N_2O_2$ flows over catalyst 110 before entering stagnation chamber 140. However, the $N_2O/N_2O_2$ can come in contact with a catalyst at any point before the $N_2O/N_2O_2$ is mixed with the fuel (in this example, the $C_3H_8$). For example, sintered mesh disc 180 can be made from a catalyst and would, therefore, serve dual purposes of creating a pressure drop and acting as a catalyst for the decomposition of the $N_2O/N_2O_2$.

In order to attain homogenous reaction rates, the gas is heated above its auto-decomposition temperature, unless a heterogeneous surface such as a catalyst is incorporated. Catalysts are designed to lower the activation energy barrier, thus allowing the decomposition to occur at much lower temperatures. The principal catalytic action can originate from charge donation into the antibonding orbitals, weakening the N—O bond and thereby lowering the activation energy and thus the reaction temperature.

Various catalyst combinations were tested, over a range of initial pressures and reactor lengths. These catalysts include a platinum monolith, granular tungsten carbide, rhodium (0.17% granular), gold, platinum/palladium monolith, iridium (granular) and a Shell 405-Ir based catalyst bed. Each of these catalysts was preheated to various temperatures (122° F., 303° F., 398° F., 401° F. and 662° F.) using a linear temperature controller to determine the minimum light-off temperature. Catalyst activation requires a minimum initial temperature, with activation increasing as temperature increases. Instabilities occur at temperatures above a given value, which is material dependent.

Chemisorption experiments were conducted to assess the adsorption characteristics of various candidate catalyst materials, a property critical in a heterogeneous catalysis process, as is the case for the NOP rocket catalyst reactor. Conclusions drawn from the relative adsorption tests on Shell-405 and Co-ZSM-5 catalysts, lead to a decision to perform reactive flow studies in an experimental reactor. The same would hold true for the $N_2O/N_2O_4$ oxidizer solution.

Figure 8:
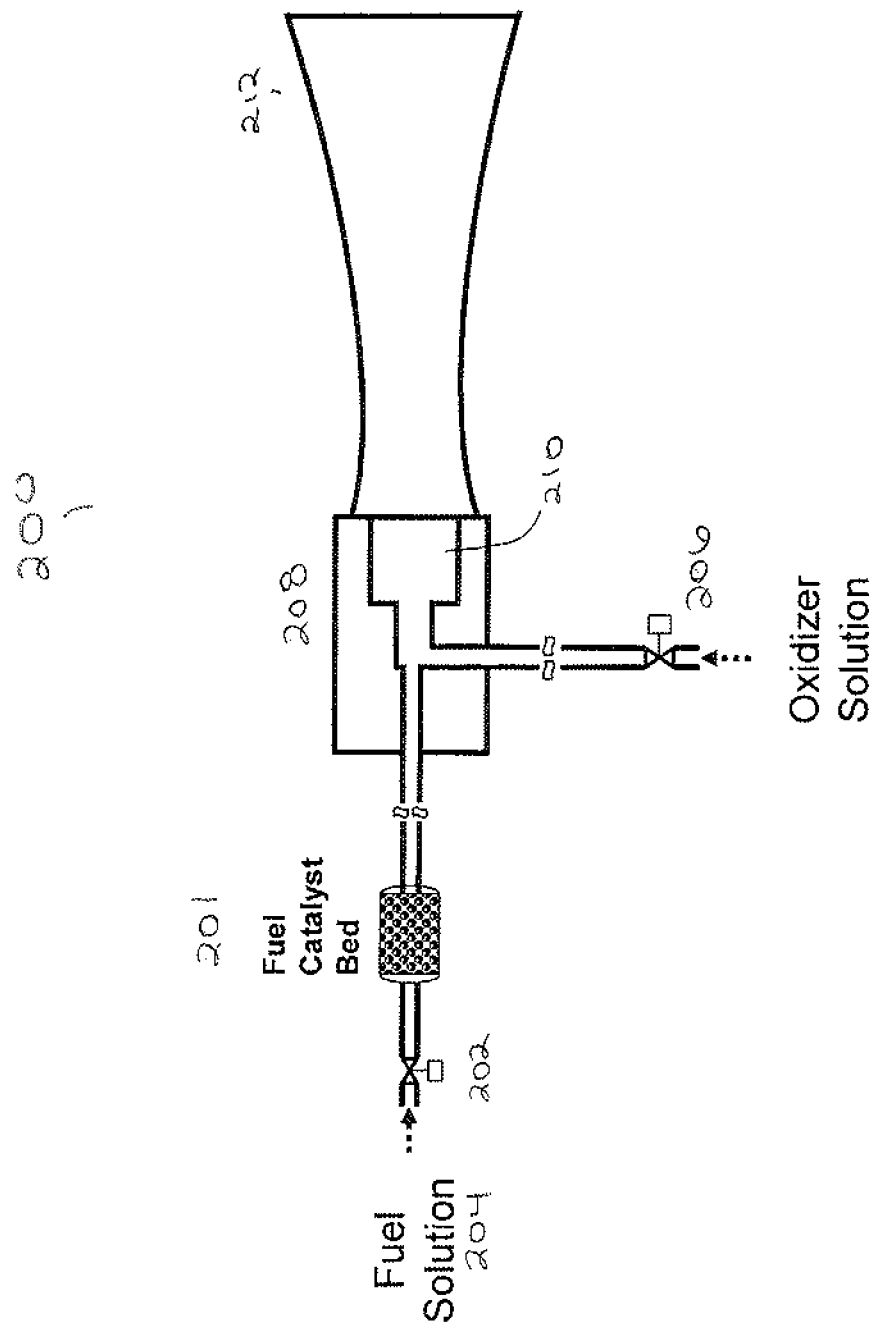
FIG. 8 shows a rocket engine with an oxidizer catalyst bed in accordance with an embodiment of the invention.
Figure 9:
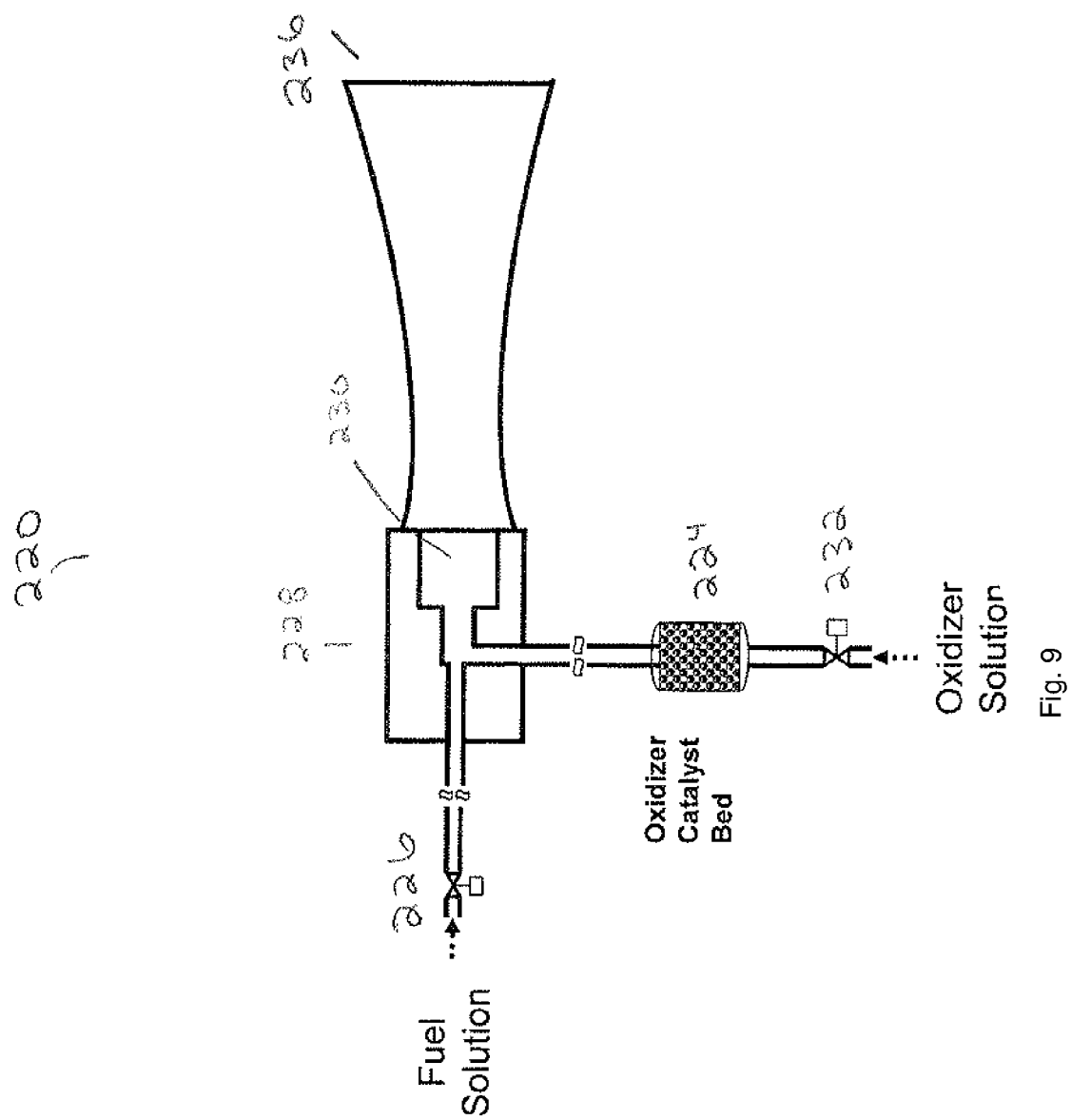
FIG. 9 shows a rocket engine with a fuel catalyst bed in accordance with an embodiment of the invention.
Figure 10:
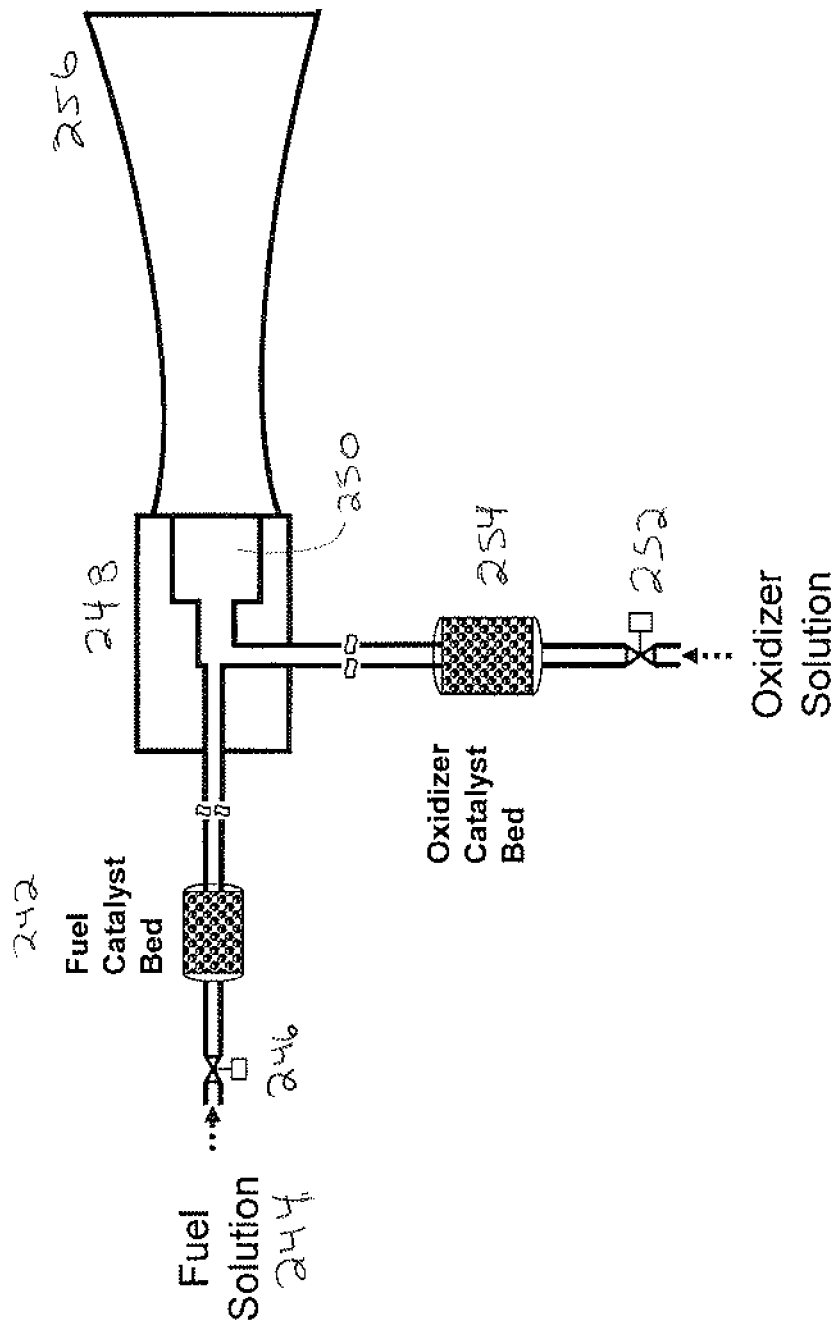
FIG. 10 shows a rocket engine with an oxidizer catalyst bed and a fuel catalyst bed in accordance with an embodiment of the invention.

FIGS. 8-10 show schematic examples of a rocket engine in accordance with embodiments of the invention. FIG. 8 shows an engine 200 with an injector chamber (not shown) that mixes the oxidizer and fuel. A fuel catalyst bed 201 is located on the fuel side of the system and fed from a valve 202 that decomposes an imbedded trigger. One example of an imbedded trigger is propylene, also known as propene or methylethylene, which is an unsaturated organic compound having the chemical formula $C_3H_6$. This compound has one double bond, and is the second simplest member of the alkene class of hydrocarbons. The trigger is catalyzed in the catalyst bed 200 which raises the temperature of the fuel 204. The $N_2O/N_2O_4$ oxidizer solution is introduced through valve 206 in the injector body 208. Mixing the heated fuel 204 with the $N_2O/N_2O_4$ oxidizer solution causes spontaneous ignition when within the combustion chamber 210 and produces combustion products that expand and produce thrust from the rocket nozzle 212.

In an additional embodiment, FIG. 9 illustrates an engine 220 similar to the NOP rocket engine concept discussed previously. Here, the oxidizer and fuel are mixed in an injector chamber (not shown). A catalyst bed 224 is located on the oxidizer side of the system. The catalyst bed 224 is fed from valve 232 that decomposes an imbedded trigger (e.g., anhydrous ammonia) (not shown). This trigger is catalyzed in the catalyst bed 224 which raises the temperature of the oxidizer. The fuel solution is introduced through valve 226 into injector body 228 and mixed with the hot oxidizer. The oxidizer and fuel then ignite spontaneously within the combustion chamber 230 and produce combustion products that expand and produce thrust from the rocket nozzle 236.

FIG. 10 shows the engine concept, similar to the NOP rocket engine concept with an injector chamber (not shown) that mixes the oxidizer and fuel. A catalyst bed is located on both the fuel side 242 (fed from valve 246) and the oxidizer side 254 (fed from valve 252). The catalyst beds 242 and 254 decompose imbedded triggers (e.g., propylene on the fuel side or anhydrous ammonia on the oxidizer side). These triggers are catalyzed in the fuel catalyst bed 242 and oxidizer catalyst bed 254. This raises the temperature of the constituents such that when they are mixed and introduced into the injector body 248 the oxidizer and fuel ignite spontaneously within the combustion chamber 250. This ignition produces combustion products that expand and produce thrust from the rocket nozzle 256.

What is claim is:
1. A fluid combustion system comprising:
a liquid oxidizer solution for use in a rocket propulsion system comprising nitrous oxide dissolved into nitrogen tetroxide that is a homogenous and stable liquid at room temperature, a hydrocarbon fuel that is a homogenous and stable liquid at room temperature, the hydrocarbon fuel containing a catalyst that is capable of causing a catalytic decomposition of at least one of the nitrous oxide and the nitrogen tetroxide and thereby creating sufficient heat to facilitate autoignition of the hydrocarbon fuel, and at least one additive having a theoretical specific energy greater than that of said nitrous oxide.

2. The fuel combustion system of claim 1, wherein said at least one additive is an earth-storable oxidizer.

3. The fuel combustion system of claim 1, wherein said liquid is non-viscous at room temperature.

4. The fuel combustion system of claim 1, wherein said liquid is a gel at room temperature.

5. The fluid combustion system of claim 1 comprising:

the oxidizer solution for use in a rocket propulsion system comprising a homogenous solution that includes nitrous oxide and approximately 28 to 52 weight percent nitrogen tetroxide, the hydrocarbon fuel that is a homogenous and stable liquid at room temperature, the hydrocarbon fuel containing a catalyst that is capable of causing a catalytic decomposition of at least one of the nitrous oxide and the nitrogen tetroxide, wherein the oxidizer solution is combined with the liquid hydrocarbon fuel containing the oxidizer catalyst capable of creating sufficient heat from a catalytic decomposition of the oxidizer solution to facilitate autoignition of the hydrocarbon fuel, and at least one additive having a theoretical specific energy greater than that of said nitrous oxide.

6. The fuel combustion system of claim 5, wherein said solution is a non-viscous liquid at room temperature.

7. The fuel combustion system of claim 5, wherein said solution is a gel at room temperature.

8. The fuel combustion system of claim 1 wherein the hydrocarbon fuel is propane.

9. The fuel combustion system of claim 1 wherein the catalyst is selected from the group consisting of platinum, rhodium, tungsten carbine, copper, cobalt and gold.

10. The fuel combustion system of claim 5 wherein the hydrocarbon fuel is propane.

11. The fuel combustion system of claim 5 wherein the oxidizer catalyst is selected from the group consisting of platinum, rhodium, tungsten carbine, copper, cobalt and gold.

12. An fuel combustion system for use in a rocket propulsion system comprising:

an oxidizer component that is a homogenous and stable liquid at room temperature including nitrous oxide dissolved into nitrogen tetroxide, and a fuel component that is a homogenous and stable liquid at room temperature including a hydrocarbon fuel and a catalyst, and at least one additive having a theoretical specific energy greater than that of said nitrous oxide wherein, following contacting the oxidizer component with the fuel component, the oxidizer solution further includes an amount of heat generated at least in part by an interaction of the catalyst with the oxidizer component that is sufficient to cause autoignition of the hydrocarbon fuel.

13. The fuel combustion system according to claim 12 wherein the oxidizer component includes between 35% and 65% (molar ratio) nitrogen tetroxide.

14. The fuel combustion system according to claim 13, wherein the at least one additive includes an earth-storable oxidizer that has a specific energy greater than that of nitrous oxide.

15. The fuel combustion system according to claim 1 wherein the oxidizer component includes between 35% and 65% (molar ratio) nitrogen tetroxide.

16. The fuel combustion system according to claim 15, wherein the at least one additive includes an earth-storable oxidizer that has a specific energy greater than that of nitrous oxide.

17. The fuel combustion system according to claim 5 wherein the oxidizer component includes between 35% and 65% (molar ratio) nitrogen tetroxide.

18. The fuel combustion system according to claim 17, wherein the at least one additive includes an earth-storable oxidizer that has a specific energy greater than that of nitrous oxide.

19. The fuel combustion system of claim 5, wherein said at least one additive is an earth-storable oxidizer.

20. The fuel combustion system of claim 12, wherein said at least one additive is an earth-storable oxidizer.

* * * * *